Feb. 22, 1955  E. W. DELANEY, JR  2,702,676
SLAT MECHANISM FOR AIRPLANES WITH SWEPTBACK WINGS
Filed April 26, 1952  3 Sheets-Sheet 1

INVENTOR.
Everett W. DeLaney, Jr.
BY
William R. Robertson
Agent

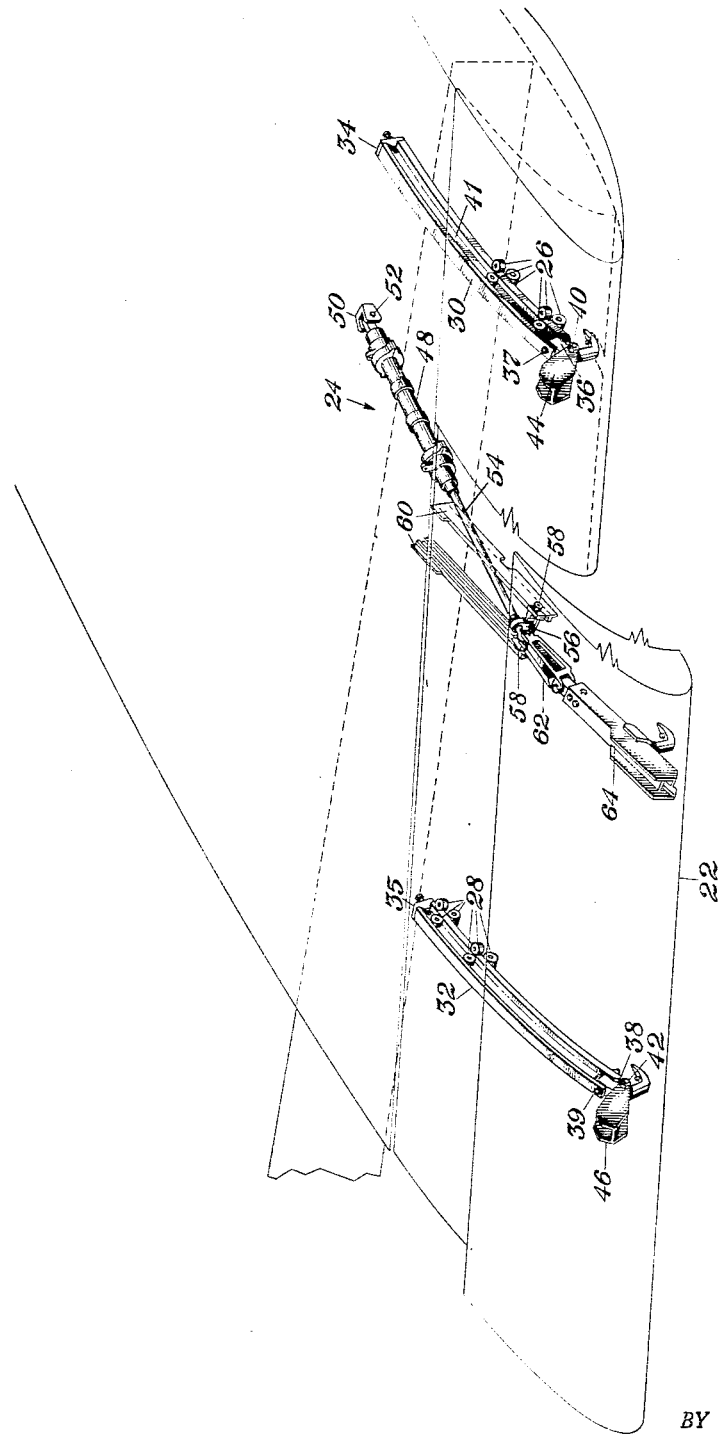
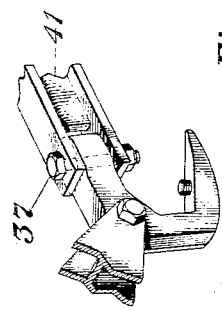
Fig. 2
Fig. 6
INVENTOR.
Everett W. Delaney, Jr
BY
William R. Robertson
Agent

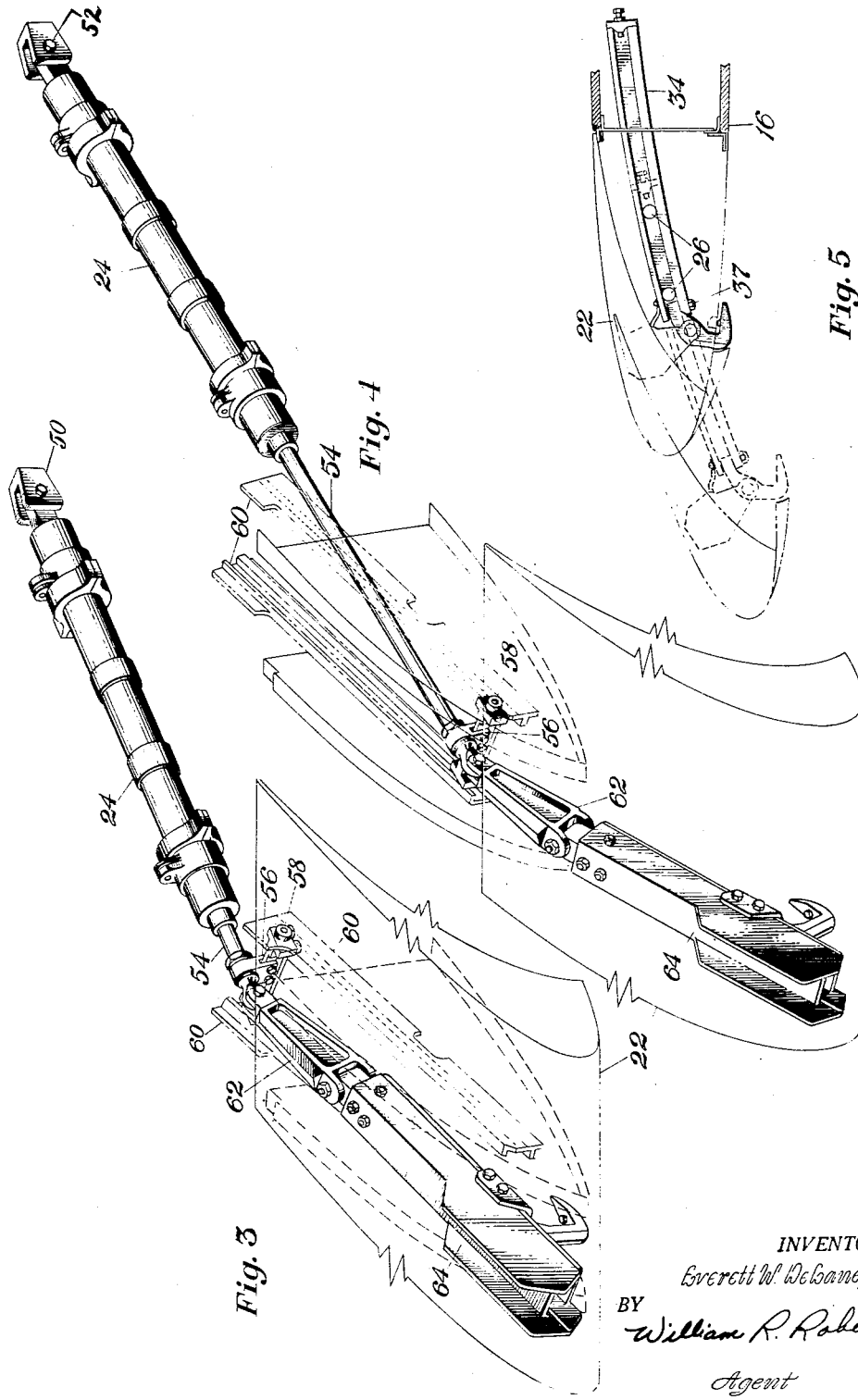

United States Patent Office 2,702,676
Patented Feb. 22, 1955

2,702,676

SLAT MECHANISM FOR AIRPLANES WITH SWEPTBACK WINGS

Everett W. Delaney, Jr., Stratford, Conn., assignor, by mesne assignments, to Chance Vought Aircraft, Incorporated, a corporation of Delaware Application April 26, 1952, Serial No. 284,573

6 Claims. (Cl. 244—42)

This invention relates to a method of improving the performance of aircraft and more particularly with mechanism for operating movable leading edge wing slats for tapered swept wing aircraft.

Leading edge slats to form slots at the leading edge of conventional straight wing aircraft are old in the art but this invention concerns itself with a mechanism for extending and rotating the leading edge slats in a swept wing aircraft. The method of slat actuation of this invention is peculiar to an airplane having sweptback wings of graduated thickness from the root to the tip. The air stream over the wing of such an airplane tends to be parallel to the longitudinal center line of the airplane at the leading edge of the wing, therefore for effective use of a slat its extension should also be parallel to the longitudinal center line of the airplane. Rotation of the slat relative to the horizontal plane of the wing to its final position either during extension or after full extension must take place about an axis parallel to the leading edge of the wing. In order that the slots formed by the slats perform an aerodynamically efficient function, the mechanism of this invention provides for the extension of the slat in one plane and slat rotation in another plane, i. e., extension of the slat parallel to the longitudinal axis of the aircraft and rotation of the slat parallel to the leading edge of the swept wing of the aircraft.

An object of this invention is to provide a leading edge slat mechanism for a swept wing airplane whereby the slat is extended in one plane and rotated in another plane.

Another object of this invention is to provide a unit slat which closely conforms to the contour of the leading edge of an airfoil.

The elements of this invention consist primarily of a leading edge slat which conforms closely to the contour of the leading edge of a wing attached to supporting tracks which are near each of the slat ends and which are movable on rollers secured within the wing and an actuator located near its center portion, the three attaching points between the slat and the supporting tracks and the actuator being in different planes and of a universal or semi-universal type.

Fig. 1, in the drawings, is a perspective view of a sweptback folding wing airplane in phantom showing the leading edge slats and the operating mechanism therefor of this invention in bold relief;

Fig. 2 is a perspective view of the outboard port wing section showing the inboard section of the slat and its operating mechanism in an extended position and the outboard portion of the slat and its support in a retracted position, Fig. 3 is a perspective view of the midsection of the outboard slat in phantom showing its actuator in a retracted position;

Fig. 4 is a view similar to Fig. 3 but with the actuator in its extended position;

Fig. 5 is a side view of the mechanism shown in Figs. 3 and 4 with the slat in a retracted position shown in solid lines and the slat in an extended position shown in broken lines; and Fig. 6 is a detailed perspective view of the universal connection between the track and the slat.

Figure 1:
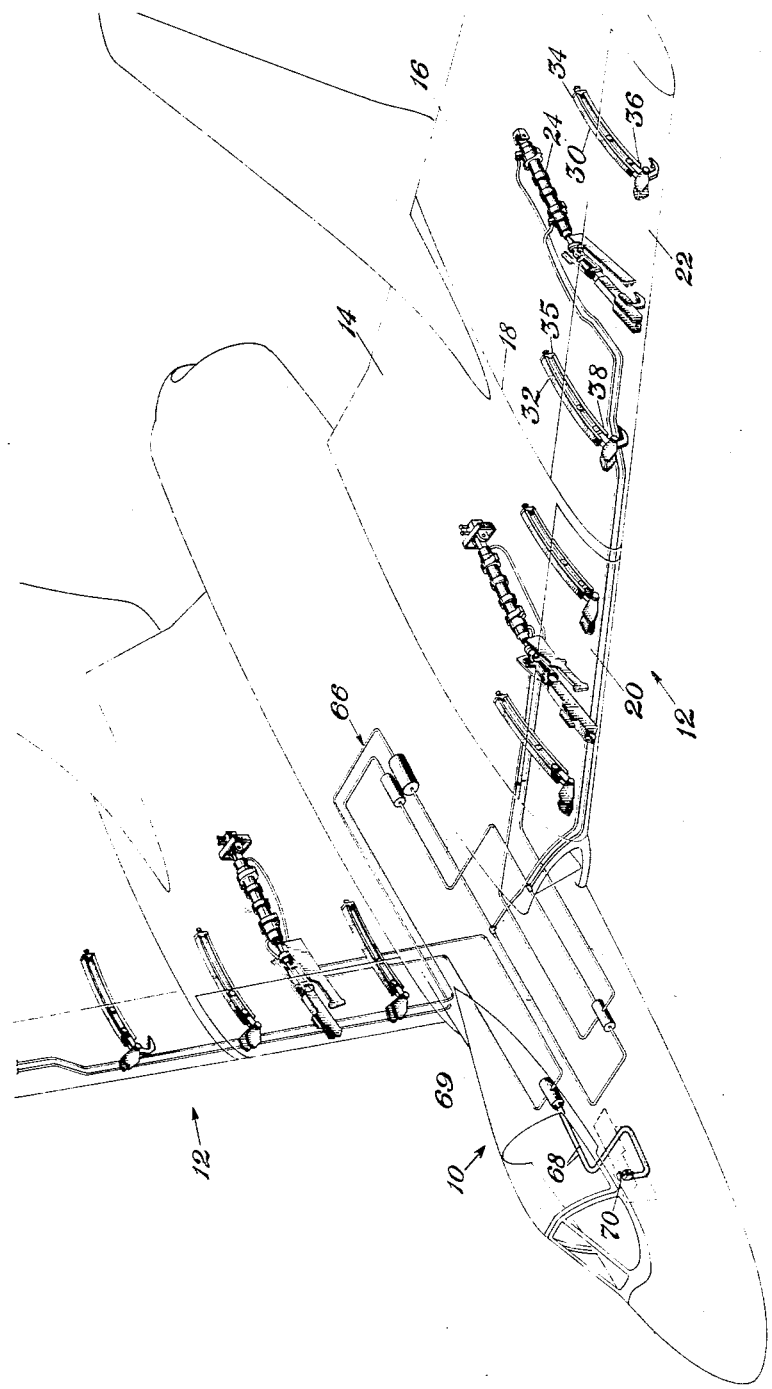

Referring now to Fig. 1, an airplane indicated at 10 has sweptback folding wings indicated at 12. Inasmuch as the mechanism of this invention is identical except for right and left hand characteristics with respect to the center line of the aircraft, only the mechanism located on the port side of the aircraft will be described. The wing 12 may be a folding wing of the type used for aircraft carrier based operations which has two principal portions, an inboard panel 14 and an outboard panel 16 which folds upwardly about hinge line 18. This necessitates the use of two leading edge slats on each wing one on each side of the wing fold hinge line 18 but it is to be understood that for conventional swept wing land based aircraft which do not contain folding wings only one slat as will hereinafter be described may be used. In wing panel 14 is a leading slat 20 and in wing panel 16 is a leading edge slat 22. These slats are shown in Fig. 1 and, since both slats are similarly constructed and actuated except for minor differences, only the slat 22 and the mechanism in panel 16 will be described. Slat 22 is actuated by hydraulic actuator 24 but it is to be understood that an electrical or mechanical actuator may be used under suitable circumstances and that the two slats 14 and 16 may be operated singly or together.

Referring now to Fig. 2, within panel 16 toward each of its ends are rollers 26 and 28 respectively which are mounted on suitable wing fixed structure and which support and guide arcuate tracks 30 and 32 respectively. In the instant preferred embodiment, tracks 30 and 32 are virtually identical, but in other cases design requirements may necessitate a different length and a different degree of curvature of one track with respect to the other track. The tracks 30 and 32 are of substantially "I" shape in cross section and are positioned on rollers 26 and 28, respectively in such a manner as to be freely movable fore and aft with respect to the aircraft within limits but so as to be completely immovable in any other direction. Plates 34 and 35 are rigidly secured to the aft ends of tracks or arms 30 and 32 respectively and function as limit stops preventing tracks 30 and 32 from being moved forward to such an extent as to become disengaged from their respective supporting rollers.

Pivotally secured to the forward ends of tracks 30 and 32 are members 36 and 38 respectively which perform a stop function similar to that of plates 34 and 35 as they prevent tracks 30 and 32 from being moved so far aft as to become disengaged from rollers 26 and 28 respectively.

Members 36 and 38 are pivotally mounted on pins 37 and 39 respectively which pass through tracks 30 and 32 respectively in a substantially vertical position, the web 41 of tracks 30 and 32 being cut away at the forward portion of the tracks to allow a limited pivotation or horizontal movement of members 36 and 38, and hence slat 22. Such horizontal movement of the slat is necessary due to the out of plane relationship of tracks 30 and 32 and the actuator 24 with connecting linkage to the slat.

Horizontal shafts 40 and 42 form pivotal connections between members 36 and 38 and fittings 44 and 46 respectively which are integral with or rigidly secured to the slat structure.

The cylinder 48 of actuator 24 is rotatably secured at its aft end to fixed wing structure 50 by shaft 52 and extends forward with the forward end of the piston shaft 54 rigidly secured to a carriage 56. Carriage 56 has rollers 58 projecting on either side and rollers 58 ride in tracks 60 which are rigidly secured to fixed wing structure and extends generally fore and aft. Pivotally secured to the forward end of shaft 54 is one end of a link 62 which has its other end rotatably secured to slat member 64. Member 64 is an integral part of the slat 22 and the arrangement of the pivotal connections at either end of link 62 is such as to provide a universal type connection between slat 22 and piston shaft 54.

Actuator 24 is energized by a conventional hydraulic system 66 (Fig. 1) controlled through electrical circuit 68 by the pilot operated switch 70.

It is easily seen that as hydraulic pressure acting forwardly in actuator 24 causes shaft 60 to be extended, carriage 56 is caused to move along tracks 60 thereby pushing link 62 and slat 22 forward. Slat 22 is guided forward generally parallel to the center line of the aircraft by the arrangement of rollers 26 and 28 and tracks 30 and 32. The curvature of the tracks 30 and 32 is so arranged that slat 22 assumes a slight downward path during the forward motion. As rollers 26 and 28 come in contact with stops 34 and 36 respectively slat 22 is prevented from further forward motion but as shaft 54 continues to move forward slat 22 will be caused to rotate about its pivot points 40 and 42. Because of decreasing taper of the wing from the wing root, the center line of shafts 40, 42 and 56 each lie in a different plane and shaft 56 being above shafts 40 and 42 causes slat 22 to rotate about the axis of shafts 40 and 42. The length of tracks 30 and 32 is so arranged that when they are fully extended forwardly shafts 40 and 42 are at points parallel to the leading edge of wing 16, thus slat 22 is thereby caused to rotate about an axis parallel to the leading edge of wing panel 16. The procedure is of course reversed when the operation of actuator 24 is reversed.

It is apparent therefore that a leading edge slat for a swept wing aircraft which closely conforms to the contour of the leading edge of said wing has been provided along with operable mechanism to extend the slat in one plane, i. e., parallel to the center line of the aircraft and to rotate it in another, i. e., parallel to the leading edge of said wing.

It will be evident that various modifications in the arrangement and construction of the components of the leading edge slat and its operating mechanism are possible without departing from the scope of the invention as shown in the embodiment of the invention illustrated in the accompanying drawings.

What it is desired to be secured by Letters Patent is:

1. In an airplane having a body portion and sweptback tapered wings extending oppositely from said body portion, a movable slat forming the leading edge of each of said wings and mechanism for extending each of said slats forwardly in a predetermined path of movement parallel to the longitudinal centerline of said airplane and rotating said slats relative to said wing about an axis parallel to the leading edge of said sweptback wings including power means for moving said slat, an arcuate track near each of the extremities of said slat, said tracks being out of alignment with each other, a plurality of rollers mounted in said wing for engagement with said tracks to restrain the same in said predetermined path of movement, and a universal connection between each of said tracks and said slat to permit a slight transverse movement of the same due to misalignment of said tracks while maintaining said slat in said path of movement.

2. In an airplane having a body portion and sweptback tapered wings extending oppositely from said body portion, a movable slat forming the leading edge of said wings and mechanism for extending each of said slats forwardly in a predetermined path of movement parallel to the longitudinal centerline of said airplane and rotating said slats relative to said wing about an axis parallel to the leading edge of said sweptback wing including a hydraulic strut in said wing having a universal connection with said slat for moving the same, an arcuate track near each of the extremities of said slat, said tracks being out of alignment with each other, a plurality of rollers mounted in said wing for engagement with said tracks to restrain the same in said predetermined path of movement, and a universal connection between each of said tracks and said slat to permit a slight transverse movement of the same due to misalignment of said tracks while maintaining said slat in said path of movement.

3. In an airplane having a body portion and sweptback tapered wings extending oppositely from said body portion, said wings having extendible slot forming slats at their leading edge, a hydraulic strut in said wing for extending said slats, said strut having a universal connection with said slat, means for controlling the forward extension of said slats in a path parallel to the longitudinal centerline of the airplane and rotating said slats relative to said wing about an axis parallel to the leading edge of said wing including a pair of arcuate tracks each having a universal attachment at their forward end to said slat, said tracks being in different horizontal planes and one extending ahead of the other due to the sweepback and taper of said wings, and a plurality of rollers mounted in said wing engaging said tracks and positioned to form a curved path of movement for said tracks.

4. In an airplane having a body portion and sweptback tapered wings extending oppositely from said body portion, said wings having extendible slot forming slats at their leading edge, a manually controllable hydraulic strut in each of said wings having a universal connection with said slat for extending the same, means for controlling the forward extension of each of said slats in a path parallel to the longitudinal centerline of the airplane and rotating said slats relative to said wing about an axis parallel to the leading edge of said wing including a pair of arcuate tracks each having a universal attachment at their forward end to said slat, said tracks being in different horizontal planes and one extending ahead of the other due to the sweepback and taper of said wings, a plurality of rollers mounted in said wing engaging said tracks and positioned to form a curved path of movement for said tracks, stops on said tracks to engage said rollers when said tracks are at the end of their travel, and pivotal connections in said universal attachments whereby further extension of said manually controllable means for extending said slats when said tracks are at the end of their travel will pivot said slats about said pivotal connections.

5. In a slat control mechanism in a sweptback tapered wing of an aircraft, a pair of chordwise movable and spanwise spaced arcuate arms carrying said slat, rollers positioned in said wing to engage said arms and restrain the same in paths parallel to the longitudinal centerline of said aircraft, stops on said arms to engage said rollers when said arms reach the end of their travel, drive means having a universal connection with said slat, and universal connections between said arms and said slat whereby further extension of said drive means when said stops are against said rollers will rotate said slat.

6. A control mechanism for a slat on the leading edge of a sweptback wing of an airplane comprising forwardly extendable means mounted on said wing, universal connection means securing said slat to the forward ends of said extendable means; stop means for limiting the forward movement of said extendable means; drive means mounted on said wings; and universal connection means connecting said drive means to said slat, said drive means moving said slat forwardly until the forward movement of said extendable means is arrested by said stop means and rotating said slot downwardly about an axis parallel to the leading edge of the wing after its forward movement is arrested.

References Cited in the file of this patent

UNITED STATES PATENTS 2,600,527    Gordon _____ June 17, 1952
2,620,147    Butler _____ Dec. 2, 1952

OTHER REFERENCES

Jane's All the World's Aircraft, 1949–1950 (F–86 Sabre), p. 258C.